(12) United States Patent
Tanaka

(10) Patent No.: US 8,896,270 B2
(45) Date of Patent: Nov. 25, 2014

(54) SEMICONDUCTOR INTEGRATED CIRCUIT, PROTECTION CIRCUIT, AND BATTERY PACK

(75) Inventor: Hidenori Tanaka, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 351 days.

(21) Appl. No.: 13/593,953

(22) Filed: Aug. 24, 2012

(65) Prior Publication Data

US 2013/0050891 A1  Feb. 28, 2013

(30) Foreign Application Priority Data

Aug. 30, 2011 (JP) .................. 2011-186998

(51) Int. Cl.
*H02J 7/00* (2006.01)
*H02H 7/18* (2006.01)
*H02H 3/16* (2006.01)

(52) U.S. Cl.
CPC .............. *H02J 7/0029* (2013.01); *H02H 7/18* (2013.01); *H02J 7/0031* (2013.01); *H02H 3/16* (2013.01)
USPC .......................................... 320/134; 320/136

(58) Field of Classification Search
CPC .............. H02J 7/0031; H02J 2007/004; H02J 2007/0037; Y02E 60/12; H01M 10/48
USPC ........................................................ 320/134
See application file for complete search history.

(56) References Cited

U.S. PATENT DOCUMENTS

| | | | |
|---|---|---|---|
| 5,418,751 A * | 5/1995 | Kaiser | 365/211 |
| 6,194,871 B1 * | 2/2001 | Haraguchi et al. | 320/134 |
| 6,381,189 B2 * | 4/2002 | Nagumo | 365/229 |
| 8,144,024 B2 * | 3/2012 | Akimov et al. | 340/636.1 |
| 8,330,469 B2 * | 12/2012 | Miyamoto | 324/433 |
| 2001/0054880 A1 * | 12/2001 | Haraguchi et al. | 320/134 |
| 2002/0000873 A1 * | 1/2002 | Tanizaki et al. | 327/546 |
| 2002/0050806 A1 * | 5/2002 | Fujiwara | 320/136 |
| 2004/0021505 A1 * | 2/2004 | Watanabe | 327/540 |
| 2004/0100226 A1 * | 5/2004 | Sakurai | 320/136 |
| 2007/0205755 A1 * | 9/2007 | Fujieda | 324/158.1 |
| 2009/0243546 A1 | 10/2009 | Sakurai et al. | |
| 2010/0271052 A1 * | 10/2010 | Ishikawa et al. | 324/686 |
| 2011/0050175 A1 * | 3/2011 | Odaohhara et al. | 320/134 |

FOREIGN PATENT DOCUMENTS

JP  2009-247100  10/2009

* cited by examiner

*Primary Examiner* — Arun Williams
(74) *Attorney, Agent, or Firm* — IPUSA, PLLC

(57) ABSTRACT

A semiconductor integrated circuit includes a regulator including an output terminal; a switch connected to the output terminal of the regulator; a pull-down resistor connected to the switch; and a leak detection circuit configured to detect a leak current generated in the semiconductor integrated circuit, and turn on the switch when the leak current is detected so that the pull-down resistor is connected via the switch to the output terminal of the regulator and a voltage output from the output terminal of the regulator is pulled down by the pull-down resistor.

7 Claims, 3 Drawing Sheets

SEMICONDUCTOR INTEGRATED CIRCUIT, PROTECTION CIRCUIT, AND BATTERY PACK

CROSS-REFERENCE TO RELATED APPLICATION

The present application is based upon and claims the benefit of priority of Japanese Patent Application No. 2011-186998, filed on Aug. 30, 2011, the entire contents of which are incorporated herein by reference.

BACKGROUND OF THE INVENTION

1. Field of the Invention

An aspect of this disclosure relates to a semiconductor integrated circuit, a protection circuit, and a battery pack.

2. Description of the Related Art

Portable devices driven by a rechargeable secondary battery are widely used. Such a secondary battery is often provided as a battery pack including a protection circuit. The protection circuit, for example, includes a function to protect the secondary battery from overcharge and overdischarge, and a function to monitor and manage the remaining energy level of the secondary battery.

FIG. 1 is a circuit diagram illustrating an exemplary configuration of a related-art protection circuit 10. As illustrated in FIG. 1, the protection circuit 10 includes a protection integrated circuit (IC) 11, a battery monitoring IC 12, a switching transistor M1, and a switching transistor M2. The protection circuit 10 further includes a terminal B+, a terminal B−, a terminal P+, and a terminal P−. A secondary battery B1 is connected between the terminal B+ and the terminal B−, and a charger or a load (not shown) is connected between the terminal P+ and the terminal P−. The protection IC 11 and the battery monitoring IC 12 are connected to each other to enable communications.

The protection IC 11 is driven by a voltage VDD supplied from the secondary battery B1. The protection IC 11 includes an N-type substrate. When detecting overcharge of the secondary battery B1 based on a voltage between VDD and VSS terminals (hereafter referred to as a "VSS-VDD voltage"), the protection IC 11 outputs a control signal from a terminal COUT to turn off the switching transistor M1 and thereby stop charging the secondary battery B1. Meanwhile, when detecting overdischarge of the secondary battery B1 based on the VSS-VDD voltage, the protection IC 11 outputs a control signal from a terminal DOUT to turn off the switching transistor M2 and thereby stop discharge from the secondary battery B1.

The battery monitoring IC 12 is supplied with a voltage generated from the voltage VDD by a regulator of the protection IC 11, and monitors the status of the secondary battery B1. The status of the secondary battery B1 includes, for example, the remaining energy level of the secondary battery B1 and a history of abnormal states of the secondary battery B1.

FIG. 2 is a circuit diagram illustrating an exemplary configuration of the protection IC 11. The protection IC 11 includes a reference voltage generating circuit 13, a comparator 14, a logic circuit 15, a regulator 16, a resistor R1, and a resistor R2.

The resistors R1 and R2 divide the VSS-VDD voltage. The comparator 14 compares the divided VSS-VDD voltage with a reference voltage generated by the reference voltage generating circuit 13, and outputs the comparison result to the logic circuit 15. The logic circuit 15 detects overcharge or overdischarge based on the comparison result from the comparator 14, and outputs a control signal from the terminal COUT or the terminal DOUT according to the detection result.

The reference voltage generated by the reference voltage generating circuit 13 is also supplied to the regulator 16. The regulator 16 includes an amplifier 17, a resistor R3, and a resistor R4. The reference voltage from the reference voltage generating circuit 13 is supplied to one of the input terminals of the amplifier 17. The other one of the input terminals of the amplifier 17 is supplied with an output voltage of the amplifier 17 itself. Also, the output voltage of the amplifier 17 is divided by the resistors R3 and R4, and the divided voltage is output from the regulator 16.

To charge the secondary battery B1, a charger is connected between the terminals P+ and P−. Here, it sometimes happens that the charger is connected in the reverse direction to the secondary battery B1 such that the positive and negative electrodes of the charger are connected to the opposite electrodes of the secondary battery B1. Hereafter, this connection state is referred to as a "reverse charger connection state". In the reverse charger connection state, an excessive voltage is applied to the negative electrode of the secondary battery B1, which is an abnormal state for the secondary battery B1. For this reason, technologies have been proposed to prevent occurrence of the reverse charger connection state.

For example, Japanese Laid-Open Patent Publication No. 2009-247100 discloses a technology to stop charging a secondary battery when the reverse charger connection state is detected.

Referring to FIG. 1, when the reverse charger connection state occurs, the voltage at the terminal P− rises. As a result, the protection IC 11 detects a discharge overcurrent or a short circuit and turns off the transistor M2. However, since the substrate of the protection IC 11 is an N-type substrate whose substrate voltage is VDD, a parasitic transistor operates and a leak current is generated in the protection IC 11 when a terminal voltage becomes greater than VDD due to the reverse charger connection state. This leak current causes the output voltage of the regulator 16 to rise, and the output voltage may damage the battery monitoring IC 12.

SUMMARY OF THE INVENTION

In an aspect of this disclosure, there is provided a semiconductor integrated circuit that includes a regulator including an output terminal; a switch connected to the output terminal of the regulator; a pull-down resistor connected to the switch; and a leak detection circuit configured to detect a leak current generated in the semiconductor integrated circuit, and turn on the switch when the leak current is detected so that the pull-down resistor is connected via the switch to the output terminal of the regulator and a voltage output from the output terminal of the regulator is pulled down by the pull-down resistor.

DESCRIPTION OF THE PREFERRED EMBODIMENTS

Preferred embodiments of the present invention are described below with reference to the accompanying drawings.

Figure 1:
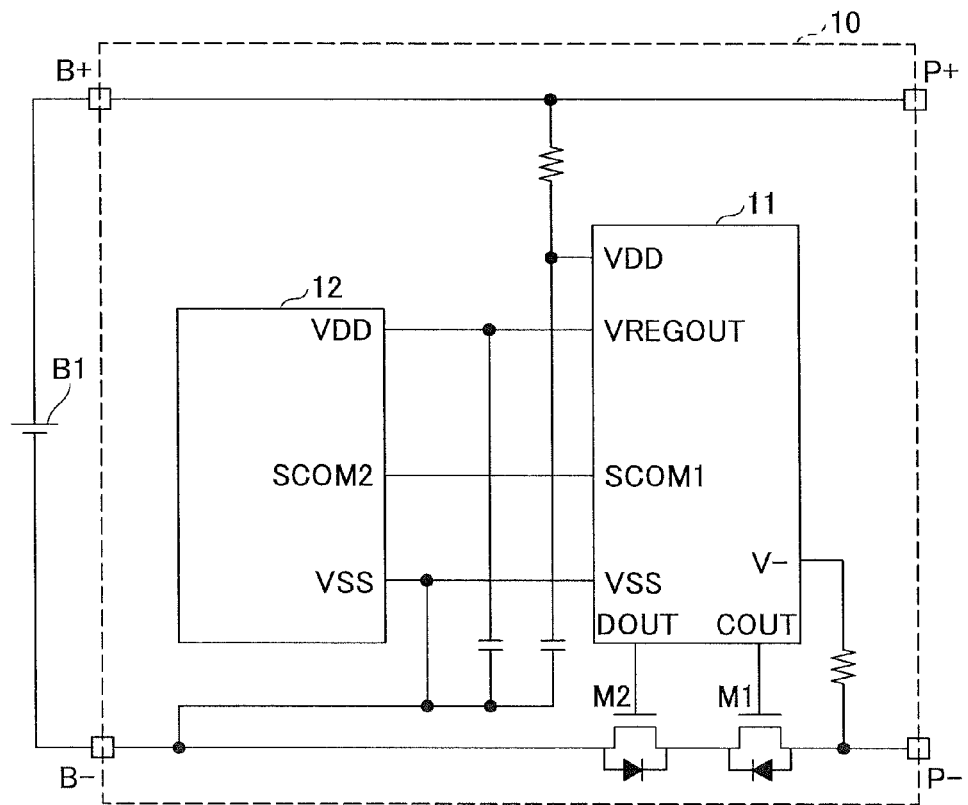
FIG. 1 is a circuit diagram illustrating an exemplary configuration of a related-art protection circuit.
Figure 2:
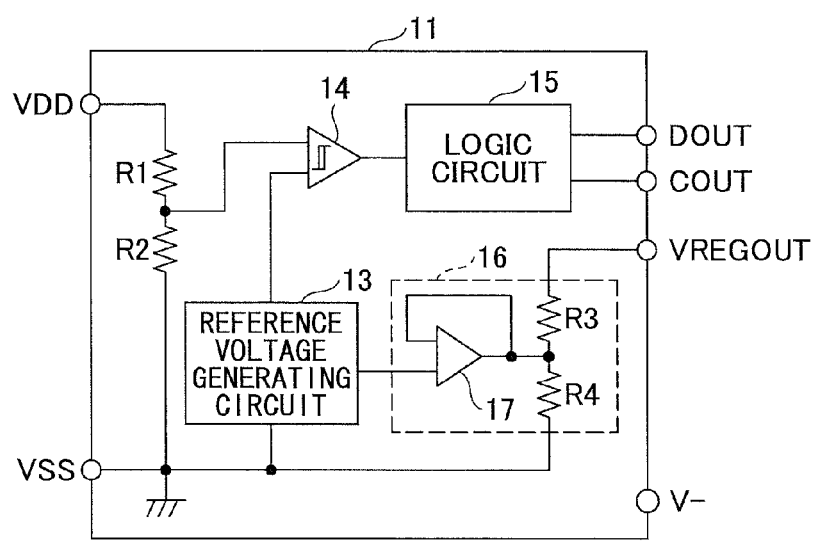
FIG. 2 is a circuit diagram illustrating an exemplary configuration of a related-art protection IC.
Figure 3:
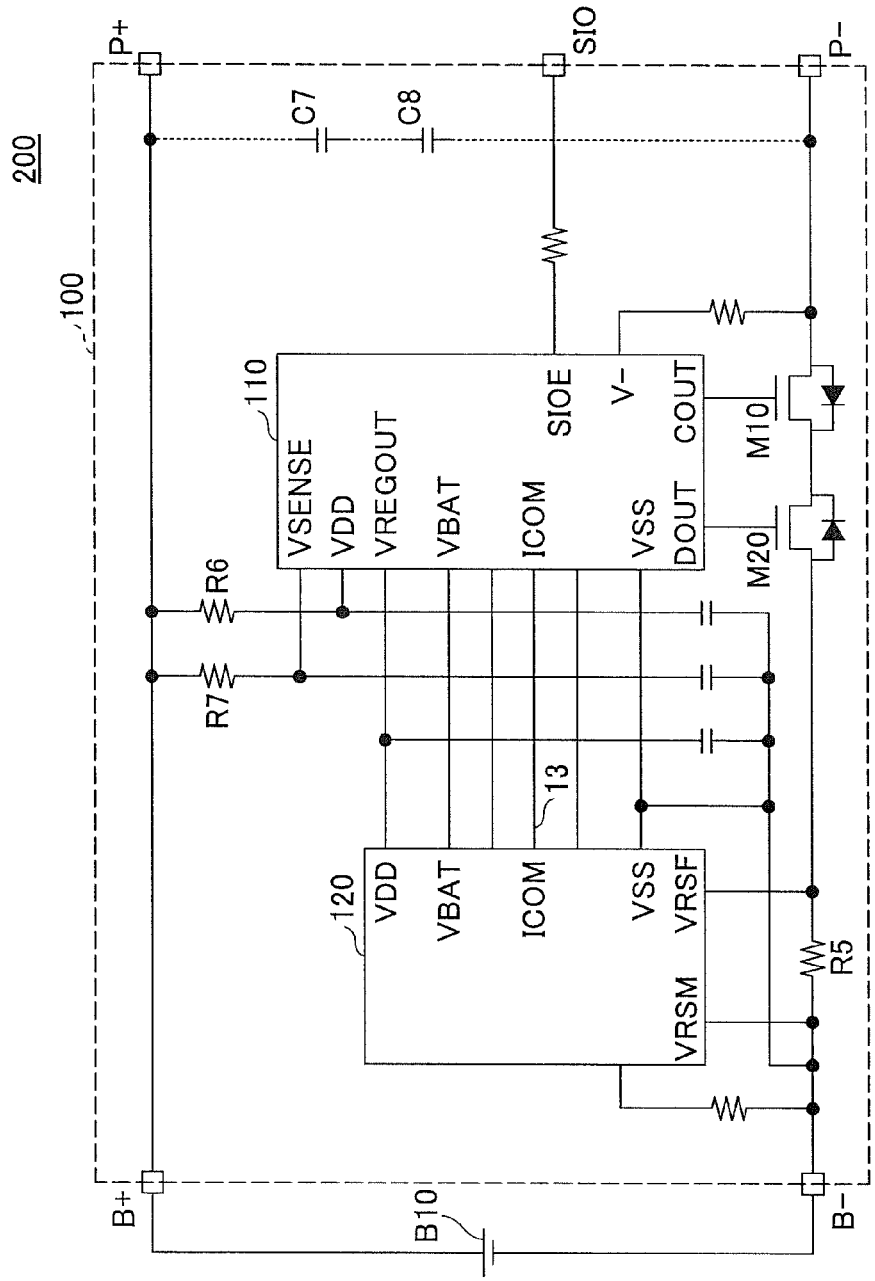
FIG. 3 is a circuit diagram illustrating an exemplary configuration of a protection circuit according to an embodiment.

FIG. 3 is a circuit diagram illustrating an exemplary configuration of a protection circuit 100 according to an embodiment.

As illustrated in FIG. 3, the protection circuit 100 is connected to a rechargeable secondary battery B10 to form a battery pack 200. The battery pack 200 is provided, for example, in a portable device (not shown), and supplies the battery voltage of the secondary battery B10 to the portable device.

The secondary battery B10 may be implemented by, for example, a lithium-ion battery and is connected between terminals B+ and B− of the protection circuit 100. The terminal B+ is connected to a terminal P+, and the terminal B− is connected via a resistor R5 and MOS transistors M20 and M10 to a terminal P−. A load or a charger (not shown) is connected between the terminals P+ and P−. When a charger is normally (or correctly) connected to the protection circuit 100, the positive terminal of the charger is connected to the terminal P+, and the negative terminal of the charger is connected to the terminal P−.

The protection circuit 100 may include a protection integrated circuit (IC) 110 and a battery monitoring IC 120. The battery monitoring IC 120 includes a terminal VRSM and a terminal VRSF to which voltages at the ends of the resistor R5 are supplied. Based on a potential difference between the terminals VRSM and VRSF, the battery monitoring IC 120 detects charge and discharge currents of the secondary battery B10. The battery voltage of the secondary battery 810 is supplied via the protection IC 110 to a terminal VBAT of the battery monitoring IC 120. The battery monitoring IC 120 also detects the voltage of the secondary battery B10 based on the voltage at the terminal VBAT.

Also, stable power is supplied from the protection IC 110 to a terminal VDD of the battery monitoring IC 120. The battery monitoring IC 120 may include a microcomputer that totals values of charge and discharge currents of the secondary battery B10 to calculate the remaining energy level of the secondary battery B10. The battery monitoring IC 120 also detects overvoltage and overcharge/overdischarge currents of the secondary battery B10, and controls the protection IC 110 based on the detection results. Further, the battery monitoring IC 120 retains and manages a history of abnormal states of the secondary battery B10.

The protection IC 110 includes a regulator (described later) that stabilizes a voltage supplied from the secondary battery B10 via a resistor R6 to a terminal VDD, and supplies the stabilized voltage via a terminal VREGOUT to the battery monitoring IC 120. The battery voltage, of the secondary battery B10 is also supplied via a resistor R7 to a terminal VSENSE of the protection IC 110. The battery voltage is divided and supplied via a terminal VBAT to the battery monitoring IC 120.

The protection IC 110 compares the voltage at the terminal VSENSE with an overcharge threshold and an overdischarge threshold. When the voltage at the terminal VSENSE exceeds the overcharge threshold (i.e., an abnormal state is detected), the protection IC 110 turns off the MOS transistor M10. Meanwhile, when the voltage at the terminal VSENSE becomes lower than the overdischarge threshold (i.e., an abnormal state is detected), the protection IC 110 turns off the MOS transistor M20. Also, under the control of the battery monitoring IC 120, the protection IC 110 turns the MOS transistors M10 and M20 on and off to control charging and discharging of the secondary battery B10.

In the protection circuit 100, a terminal ICOM of the battery monitoring IC 120 and a terminal ICOM of the protection IC 110 are connected to each other via a signal line 13 that is used for bidirectional, three-valued serial communications between the battery monitoring IC 120 and the protection IC 110.

The protection IC 110 also detects a "reverse charger connection state" where a charger is connected in the reverse direction of polarity to the battery pack 200. More specifically, the reverse charger connection state indicates a state where the positive electrode of a charger is connected to the terminal P− and the negative electrode of the charger is connected to the terminal P+.

When the reverse charger connection state is detected, the protection IC 110 pulls down the output voltage of a regulator (described later) of the protection IC 110. Also when the reverse charger connection state is detected, the protection IC 110 turns off the transistor M20 to stop charging and discharging the secondary battery B10.

Figure 4:
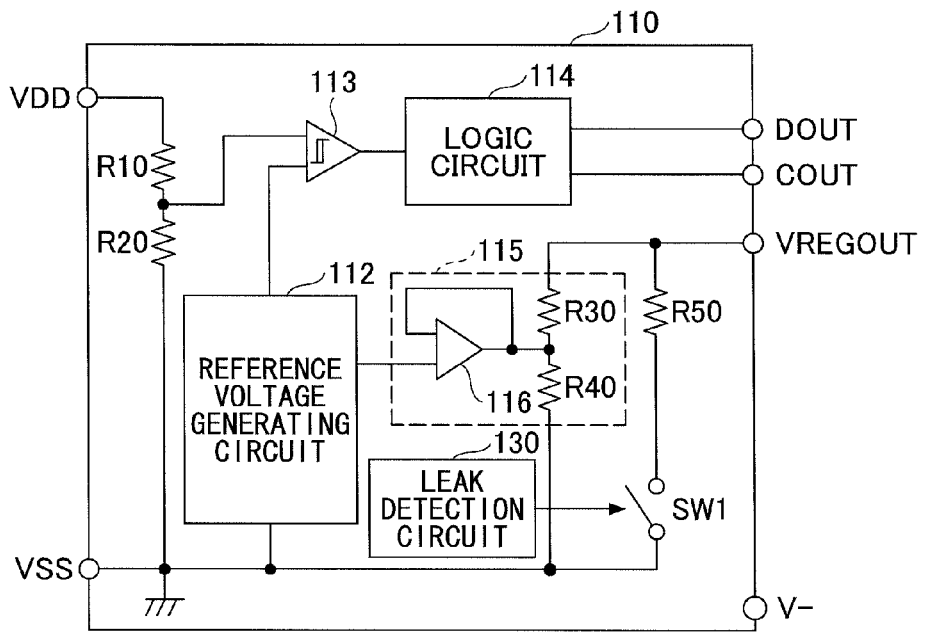
FIG. 4 is a circuit diagram illustrating an exemplary configuration of a protection IC according to an embodiment.

An exemplary configuration of the protection IC 110 is described below with reference to FIG. 4. In FIG. 4, terminals other than those necessary to describe operations of the protection IC 110 of the present embodiment are omitted.

The protection IC 110 may include a reference voltage generating circuit 112, a comparator 113, a logic circuit 114, a regulator 115, a leak detection circuit 130, a resistor R10, a resistor R20, a resistor R50, and a switch SW1.

In the protection IC 110, the resistors R10 and R20 divide the voltage between the terminals VSS and VDD (hereafter referred to as a "VSS-VDD voltage"). The comparator 113 compares the divided VSS-VDD voltage with a reference voltage generated by the reference voltage generating circuit 112, and outputs the result of comparison to the logic circuit 114. The logic circuit 114 detects overcharge or overdischarge based on the comparison result from the comparator 113, and outputs a control signal from the terminal LOUT or the terminal DOUT according to the detection result. The reference voltage generated by the reference voltage generating circuit 112 is also supplied to the regulator 115.

The regulator 115 may include an amplifier 116, a resistor R30, and a resistor R40. The reference voltage from the reference voltage generating circuit 112 is supplied to one of the input terminals of the amplifier 116. The other one of the input terminals of the amplifier 116 is supplied with an output voltage of the amplifier 116 itself. Also, the output voltage of the amplifier 116 is divided by the resistors R30 and R40, and the divided voltage is output from the regulator 115.

The leak detection circuit 130 determines whether a leak current is generated in the protection IC 110. One end of the switch SW1 is connected via the resistor R50 to an output terminal of the regulator 115, and the other end of the switch SW1 is connected to the terminal VSS. The switch SW1 is turned on and off by a signal output from the leak detection circuit 130. In the present embodiment, the output voltage of the regulator 115 is maintained within a predetermined range by the switch SW1 and the resistor R50 even when the reverse charger connection state occurs.

When the reverse charger connection state is detected, the leak detection circuit 130 outputs a high (H) level signal. Meanwhile in a normal connection state where the reverse charger connection state is not detected, the leak detection circuit 130 outputs a low (L) level signal. The switch SW1 is turned on when the H-level signal is output from the leak detection circuit 130, and is turned off when the L-level signal is output from the leak detection circuit 130.

Accordingly, when the reverse charger connection state is detected by the leak detection circuit 130, the switch SW1 is turned on, and as a result the resistor R50 is connected between the output terminal of the regulator 115 and the terminal VSS. When the resistor R50 is connected, the voltage at the terminal VREGOUT output from the regulator 115 is pulled down by the resistor R50.

The above configuration makes it possible to maintain the output voltage of the regulator 115 within a predetermined range even when the reverse charger connection state is detected. The resistance of the resistor R50 may be determined based on, for example, the voltage of the terminal V− in the reverse charger connection state and/or a normal output voltage of the regulator 115. Also, the resistance of the resistor R50 is preferably determined such that the battery monitoring IC 120, which is supplied with a voltage from the terminal VREGOUT, is not damaged even when the reverse charger connection state occurs. Further, the resistance of the resistor R50 is preferably determined such that the voltage output from the terminal VREGOUT is maintained at the normal level even when the reverse charger connection state occurs.

Figure 5:
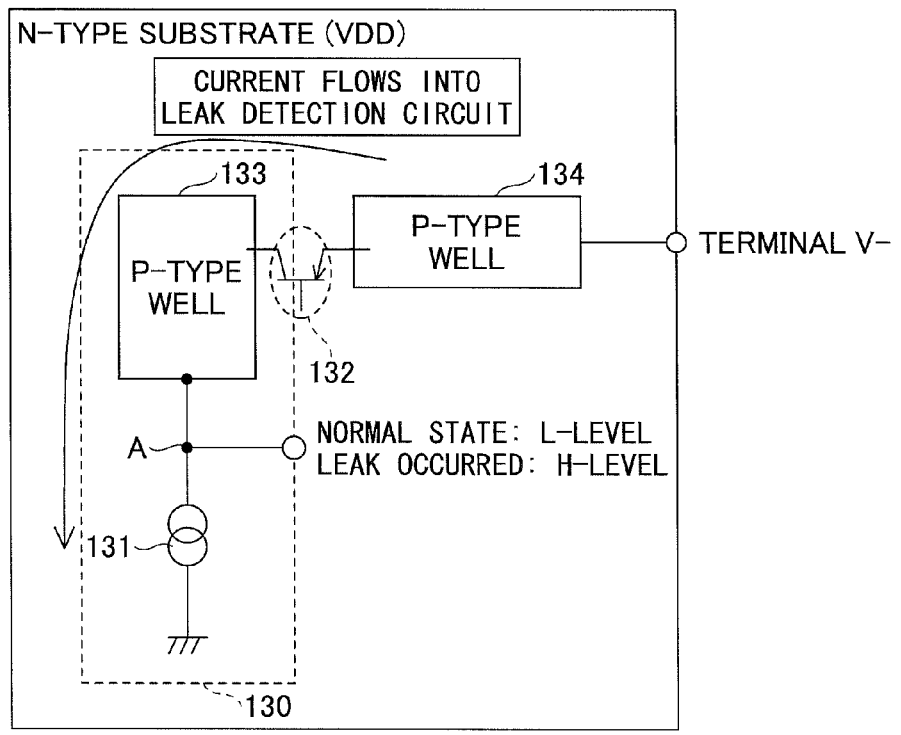
FIG. 5 is a circuit diagram illustrating an exemplary configuration of a leak detection circuit according to an embodiment.

An exemplary configuration of the leak detection circuit 130 is described below with reference to FIG. 5.

The leak detection circuit 130 of the protection IC 110 may include a constant current source 131. Here, the substrate of the protection IC 110 is an N-type substrate, and circuits and terminals of the protection IC 110 are formed in a P-type well. Accordingly, a parasitic element exists between the N-type substrate and the P-type well. In the example of FIG. 5, a parasitic transistor 132 exists between a P-type well 133 in the leak detection circuit 130 and a P-type well 134 connected to the terminal V−. The leak detection circuit 130 outputs a signal indicating the level of a voltage at a node A between the constant current source 131 and the P-type well 133.

When the reverse charger connection state occurs, i.e., a charger is connected in the reverse direction of polarity to the battery pack 200, the voltage at the terminal P− rises, and the voltage at the terminal V− of the protection IC 110 becomes greater than the voltage VDD. When the voltage at the terminal V− becomes greater than a value obtained by adding an operational threshold voltage of the parasitic transistor 132 to the voltage VDD, the parasitic transistor 132 operates. When the parasitic transistor 132 operates, the P-type well 133 in the leak detection circuit 130 is connected via the parasitic transistor 132 to the P-type well 134 that is connected to the terminal V−, and accordingly the constant current source 131 is connected to the V− terminal. As a result, a leak current flows into the leak detection circuit 130 from the terminal V−.

When the leak current flows into the leak detection circuit 130, the voltage at the node A between the constant current source 131 and the P-type well 133 increases. When the voltage at the node A becomes greater than or equal to a predetermined value, the H-level signal is output from the leak detection circuit 130 and the switch SW1 is turned on. When the switch SW1 is turned on, the voltage at the terminal VREGOUT is pulled down by the resistor R50.

Thus, the present embodiment makes it possible to maintain the output voltage of the regulator 115 within a predetermined range even when the reverse charger connection state occurs and a leak current is generated in the protection IC 110.

In the above embodiment, a supply voltage is supplied to the battery monitoring IC 120 from the regulator 115 of the protection IC 110. However, the present invention is not limited to the above described embodiment, and may be applied to any other type of semiconductor integrated circuit including a regulator.

In the above embodiment, the protection IC 110 and the battery monitoring IC 120 are connected to each other via the terminals ICOM and the signal line 13 for communications. With this configuration, when the reverse charger connection state is detected, the protection IC 110 can report the detection to the battery monitoring IC 120 as status information of the secondary battery B10.

This in turn enables the battery monitoring IC 120 to recognize occurrence of the reverse charger connection state even when the transistor M20 for discharge control is turned off.

An aspect of this disclosure provides a semiconductor integrated circuit, a protection circuit, and a battery pack that can keep an output voltage of a regulator stable even when a leak current is generated.

A semiconductor integrated circuit, a protection circuit, and a battery pack according to the preferred embodiments are described above. However, the present invention is not limited to the specifically disclosed embodiments, and variations and modifications may be made without departing from the scope of the present invention.

What is claimed is:

1. A semiconductor integrated circuit, comprising:
   a regulator including an output terminal;
   a switch connected to the output terminal of the regulator;
   a pull-down resistor connected to the switch; and
   a leak detection circuit configured to
     detect a leak current generated in the semiconductor integrated circuit, and
     turn on the switch when the leak current is detected so that the pull-down resistor is connected via the switch to the output terminal of the regulator and a voltage output from the output terminal of the regulator is pulled down by the pull-down resistor.

2. A semiconductor integrated circuit for protecting a secondary battery, the semiconductor integrated circuit comprising:
   a control circuit configured to turn on and off a discharge control switch for discharge control of the secondary battery and a charge control switch for charge control of the secondary battery;
   a regulator including an output terminal and configured to generate a voltage supplied to another semiconductor integrated circuit;
   a switch connected to the output terminal of the regulator;
   a pull-down resistor connected to the switch; and
   a leak detection circuit configured to
     detect a leak current generated in the semiconductor integrated circuit, and
     turn on the switch when the leak current is detected so that the pull-down resistor is connected via the switch to the output terminal of the regulator and the voltage output from the output terminal of the regulator is pulled down by the pull-down resistor.

3. A protection circuit for protecting a secondary battery, the protection circuit comprising:
   a discharge control switch for discharge control of the secondary battery;
   a charge control switch for charge control of the secondary battery;
   a first semiconductor integrated circuit configured to turn on and off the discharge control switch and the charge control switch; and
   a second semiconductor integrated circuit configured to be supplied with a voltage from the first semiconductor integrated circuit, wherein the first semiconductor integrated circuit includes
- a regulator including an output terminal and configured to generate the voltage supplied to the second semiconductor integrated circuit,
- a switch connected to the output terminal of the regulator,
- a pull-down resistor connected to the switch, and
- a leak detection circuit configured to
  - detect a leak current generated in the first semiconductor integrated circuit, and
  - turn on the switch when the leak current is detected so that the pull-down resistor is connected via the switch to the output terminal of the regulator and the voltage output from the output terminal of the regulator is pulled down by the pull-down resistor.

4. The protection circuit as claimed in claim 3, wherein the second semiconductor integrated circuit is configured to
- calculate a remaining energy level of the secondary battery, and
- manage a history of states of the secondary battery.

5. The protection circuit as claimed in claim 3, wherein
- the first semiconductor integrated circuit further includes a terminal connected to a negative electrode of the secondary battery;
- the leak detection circuit includes a constant current source whose one end is connected via a parasitic element to the terminal when a voltage at the terminal becomes greater than or equal to a predetermined voltage; and
- the leak detection circuit is configured to detect the leak current and turn on the switch when an output voltage of the constant current source becomes greater than or equal to a predetermined value.

6. The protection circuit as claimed in claim 3, wherein
- the first semiconductor integrated circuit and the second semiconductor integrated circuit are connected to each other for communications; and
- the first semiconductor integrated circuit is configured to report detection of the leak current to the second semiconductor integrated circuit.

7. A battery pack, comprising:
a secondary battery; and
a protection circuit as claimed in claim 3.

* * * * *